US005102066A

United States Patent [19]
Daniel

[11] Patent Number: 5,102,066
[45] Date of Patent: Apr. 7, 1992

[54] VERTICAL TAKE-OFF AND LANDING AIRCRAFT

[76] Inventor: William H. Daniel, 121 Tulsa Dr., Rogers, Ark. 72756

[21] Appl. No.: 560,582

[22] Filed: Jul. 30, 1990

[51] Int. Cl.⁵ .................. B64C 29/00; B64C 39/06
[52] U.S. Cl. ........................ 244/12.2; 244/23 C; 244/73 C
[58] Field of Search ............ 244/12.2, 23 R, 23 C, 244/23 A, 73 C

[56] References Cited

U.S. PATENT DOCUMENTS

| | | | |
|---|---|---|---|
| 1,123,589 | 1/1915 | Porter | 244/23 C |
| 2,567,392 | 9/1951 | Naught | 244/23 C |
| 2,972,455 | 2/1961 | Borchers | 244/23 C |
| 3,019,756 | 2/1962 | Murri | 244/23 C |

FOREIGN PATENT DOCUMENTS

| | | | |
|---|---|---|---|
| 777549 | 2/1935 | France | 244/23 R |
| 1281518 | 6/1964 | France | 244/12.2 |

*Primary Examiner*—Galen Barefoot
*Attorney, Agent, or Firm*—Young & Thompson

[57] ABSTRACT

In a vertical take-off and landing craft, a pair of nested dome-shaped shells are spaced apart and rigidly interconnected by struts. The outer shell has a central opening formed in its top, and the shape of the shells is such that the space between the two shells progressively widens from the central top part of the shells to the peripheral bottom part of the shells. A circular series of arcuate airfoil units is disposed in the annular space between the bottoms of the shells, and is driven in rotation by an engine mounted on the inner shell. Upon rotation of the circular series of arcuate airfoil units, low pressure is generated above the airfoil units and high pressure below, such that air is drawn down through the central opening of the outer shell to produce a thrust which permits vertical displacement of the aircraft.

8 Claims, 3 Drawing Sheets

VERTICAL TAKE-OFF AND LANDING AIRCRAFT

The present invention relates to aircraft design, and more particularly to the construction of an improved vertical take-off and landing craft (VTOL).

In copending application Ser. No. 07/521,565 of the same inventor, the discovery of important fluid dynamic principles has been embodied in a pump and oil-water separator, to improve the movement of a fluid through a body. In the present application, these principles are embodied somewhat differently, to improve the movement of a body through a fluid.

The present invention thus relates to a VTOL craft comprising a pair of nested dome-like shells, which are interconnected and maintained in spaced relation by struts. The outer shell has a central opening at its top, and the two shells together define an open annular space at their bottoms. These shells are so configured that the spacing between the two shells progressively increases from their tops to their bottoms.

Disposed in the annular space between the bottoms of the two shells is a circular series of arcuate airfoil elements, arranged with their leading edges all facing in the same direction about the circle. The airfoil elements are interconnected by a spoked member, which in turn is coupled to the output shaft of a motor housed on or within the inner shell. The motor drives the circular series of airfoil elements in rotation, within the annular space defined by the bottoms of the two shell elements.

As each of the airfoil elements is moved through the air between the two shells, there is created a reduced pressure region on its upper surface, and a higher pressure region on its lower surface, as is known in the art. Within the structure according to the invention, the low pressure regions on the upper surfaces of the airfoil elements serve to draw air through the central opening of the outer shell and down into the space between the two shells, from whence it is expelled under high pressure beneath the rotating series of airfoil elements, thereby to create a thrust which displaces the VTOL craft vertically.

The invention will be explained in greater detail with reference to the accompanying drawings, which show two preferred embodiments according to the invention, and in which.

Figure 1:
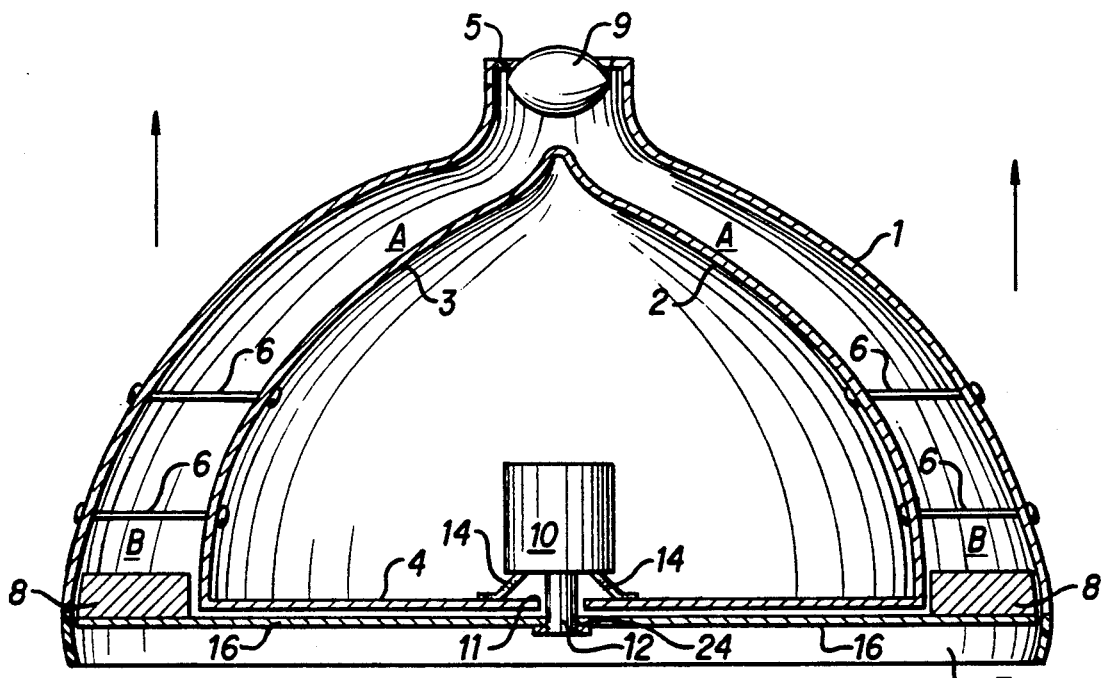
FIG. 1 is an axial section through a VTOL craft according to a first embodiment of the invention.
Figure 2:
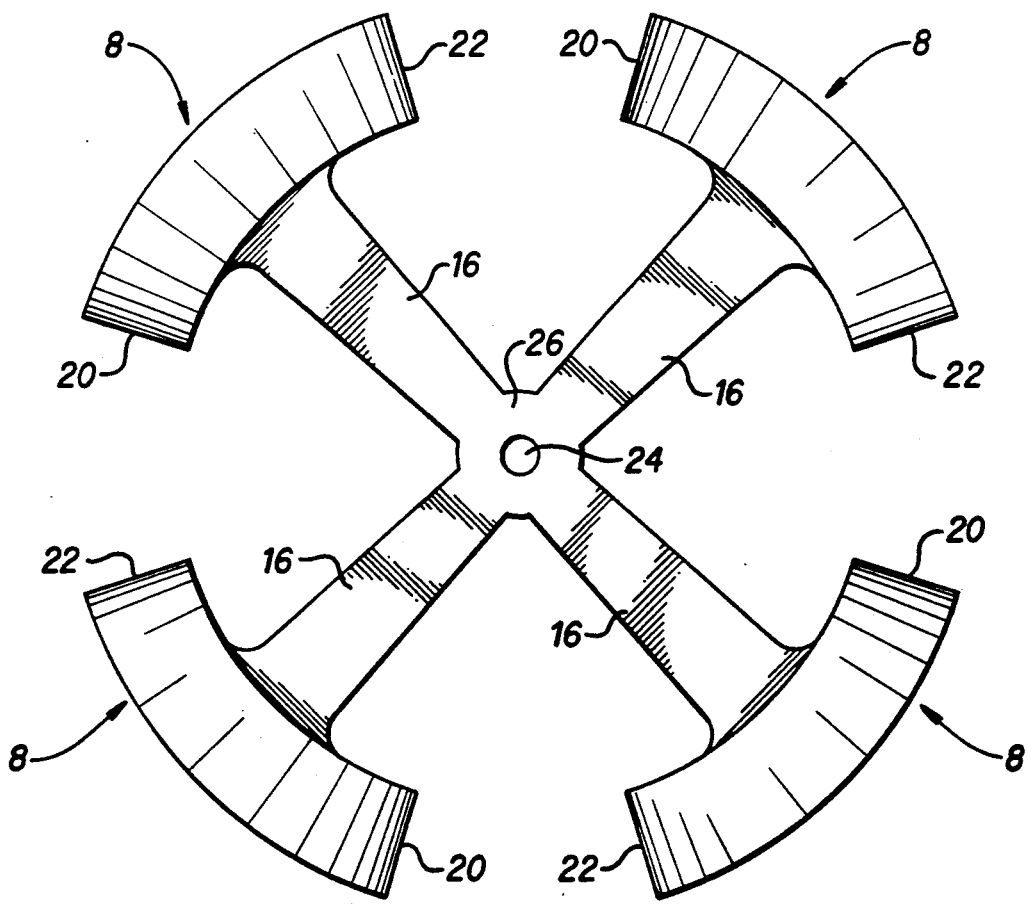
FIG. 2 is a plan view of the propeller structure used in the embodiment of FIG. 1.

Referring now to the drawings, and more particularly to FIGS. 1 and 2, there is shown a first embodiment of the VTOL craft according to the invention. As seen in FIG. 1, the craft comprises a generally dome-shaped outer shell 1, which is provided with a central opening 5 at its top and is open at its bottom. An inner shell 2 is disposed concentrically within the outer shell and is rigidly secured thereto by means of struts 6. The struts 6 must be capable of maintaining the inner and outer shells 1 and 2 as a unitary assembly, but should not be so large or so numerous as significantly to impede the airflow within the space between the two shells.

The inner shell 2 is composed of a dome-shaped member 3 and a disc-shaped floor member 4, which closes the dome-shaped member 3 at its bottom. The dome 3 and disc 4 will typically be separate interassembled elements, for ease of manufacturing, but these members may also be formed integrally such that the inner shell 2 is of one-piece construction.

On the center of the disc-shaped floor 4 is mounted a prime mover 10, supported on the floor 4 by means of supporting legs 14. The prime mover 10 may be any form of motor or engine capable of powering its output shaft 12 at an output sufficient to fly the craft. In the case of a motor fueled by a combustible fuel, suitable exhaust piping, not shown, will lead from the motor to the exterior of the craft. Exhaust piping may also open into the space between the two shells, from whence the exhaust gas will be drawn into the downward flow of air by a venturi effect.

The output shaft 12 of prime mover 10 extends downwardly through a hole 11 formed in the floor member 4, and is rigidly secured in a further hole 24 formed centrally of a plate comprising the spoke members 16.

The plate comprising spoke members 16 underlies the floor plate 4, and is better seen in the plan view of FIG. 2. As shown in FIG. 2, each of the spoke members 16 has a radially inward end connected to or formed integrally with a central member 26 comprising the hole 24, and a radially outward end connected to a respective one of the airfoil elements 8.

The radial extent of the central member 26 and the spoke members 16 may vary reciprocally beyond what is shown in FIG. 2. That is, the central member 26 may be of greater diameter, and the spoke members 16 of lesser diameter; indeed, the central member 26 may extend radially all the way to adjacent the airfoil elements 8, such that the spoke members 16 only underlie the airfoil elements 8. At present, however, it is preferred to form the propeller unit as shown in FIG. 2, to reduce the weight of the assembly. The propeller unit as shown in FIG. 2 will also permit access, between a pair of adjacent spoke members 16, to a hatch provided in the floor plate 4.

Although the propeller unit of FIG. 2 is shown comprising four airfoil units 8, it will be appreciated that the number of airfoil units, and hence the number of spoke members 16, may be varied at will depending on the size and use requirements of the VTOL craft, from a minimum of two airfoil units, up to any desired maximum number of airfoil units.

The airfoil elements 8 may be as described in the earlier U.S. Pat. No. 3,261,297 to the present inventor, the entirety of which is hereby expressly incorporated by reference to the extent not inconsistent herewith. The airfoil elements 8 according to the embodiments of FIGS. 1 and 2 differ from those depicted in U.S. Pat. No. 3,261,297, in that the present airfoil elements are curved in their horizontal plane, whereas those of the earlier U.S. patent are curved in their vertical plane.

Each of the airfoil elements 8 comprises a leading edge 20 and a trailing edge 22, with the series of airfoil elements 8 arranged such that the leading edges all face in the same direction about the circle.

The propeller unit of FIG. 2 is received in the overall structure shown in FIG. 1, such that the circular series of airfoil elements 8 occupies the lowermost region of the annular space defined by the outer shell and inner shell 2.

The outer shell 1 and inner shell 2 are configured such that the space defined therebetween gradually increases from the top of the shells to the bottom. That is, the shells are closer together in the regions indicated A, and further apart in the regions indicated B, with the space between the shells progressively and continuously widening between the regions A and B. Moreover, as the shells 1 and 2 are symmetrical about an axis containing the output shaft 12 of prime mover 10, the view of FIG. 1 would be produced by taking any axial section through this embodiment.

The craft of FIG. 1 further comprises a downwardly depending annular skirt 7 attached to the lower edge of the outer shell 1. The skirt 7 may advantageously be formed of a rigid yet slightly resilient elastomer material, to promote a more gentle landing of the craft. The skirt 7 may also serve as an interconnecting member, to interconnect the depicted twin shell structure with a downwardly depending passenger or cargo compartment. In this case, the interconnecting skirt would appropriately be frusto-conical, extending radially inwardly down toward the attached passenger compartment, which passenger compartment would then have a width about the same as the diameter of the inner shell 2. The inwardly sloping walls of the interconnecting skirt in this case would have openings to permit free passage of the air flow expelled by the propeller unit. Indeed, it would be possible to attach to the interconnecting skirt a downwardly depending chain of passenger and/or cargo compartments, connected to one another in the manner of a railroad car, and with the lowermost compartment having landing gear.

Disposed within the central opening 5 at the top of the outer shell 1, is an adjustable damper 9 by which the amount of air drawn in through the opening 5 can be varied. That is, the damper 9 is controlled by the operator of the craft or by remote control, to cause the opening 5 to be more or less obstructed, and thus to increase or decrease the airflow through the opening 5.

In operation, the VTOL craft according to the embodiments of FIGS. 1 and 2 is started by operating the prime mover 10, which rotates the propeller unit of FIG. 2 by way of its output shaft 12 which is rigidly secured to the propeller unit. As the propeller unit spins within the annular space defined between the bottom of the outer shell 1 and inner shell 2, a region of low pressure is created on the upper surfaces of the airfoil elements 8, and a corresponding region of high pressure on the lower surfaces of the airfoil elements 8. In response to the low pressure, air is drawn in through the central opening 5 formed in the outer shell 1, from whence it flows downwardly from region A to region B.

According to a significant feature of the invention, the closest distance between the outer shell 1 and inner shell 2 progressively increases from the region A and B, such that the flow of air from region A to region B is progressively less constricted. In this manner, it has been found that the regions of low and high pressure above and below the propeller unit, respectively, can be maintained even though the craft is open to the atmosphere at its top and bottom.

The low and high pressure regions, along with the expulsion of air downwardly by the propeller unit, create a thrust which displaces the VTOL craft upwardly through the air, in the direction indicated by the arrows of FIG. 1. The speed of ascent can be controlled by the speed at which the propeller unit is rotated, and also by the extent to which the damper 9 is opened. By suitably slowing down the propeller and/or restricting the opening 5 with the damper 9, the descent of the craft can also be effectively controlled.

The structure shown in FIGS. 1 and 2 provides for controlled vertical displacement of the VTOL craft. It will be appreciated, however, that the VTOL craft shown can also be equipped with conventional directional controls to provide controlled lateral movement, as is within the knowledge of those skilled in the art.

Figure 3:
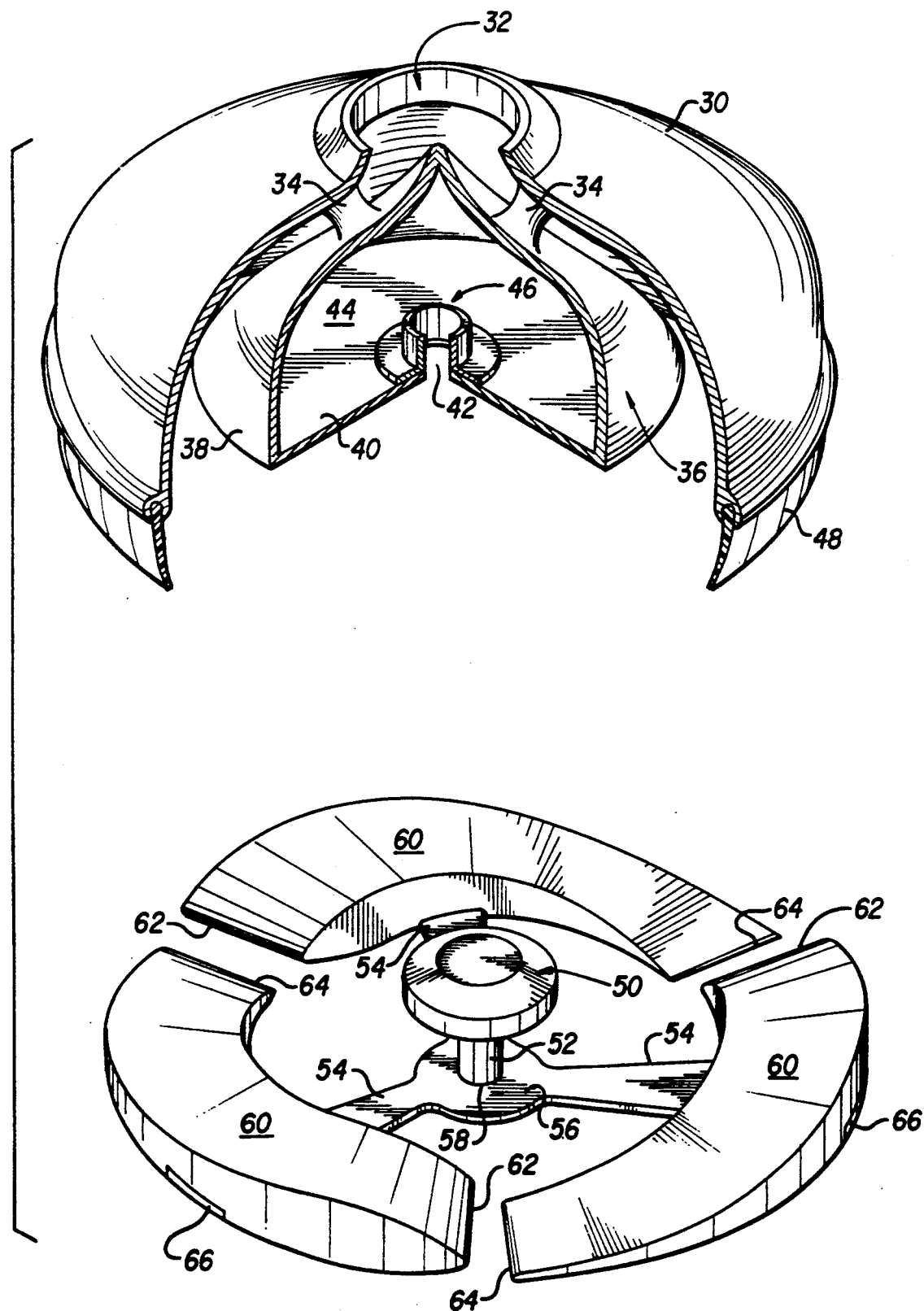
FIG. 3 is an exploded view, partially in section, of a VTOL craft according to a second embodiment of the invention.
Figure 4:
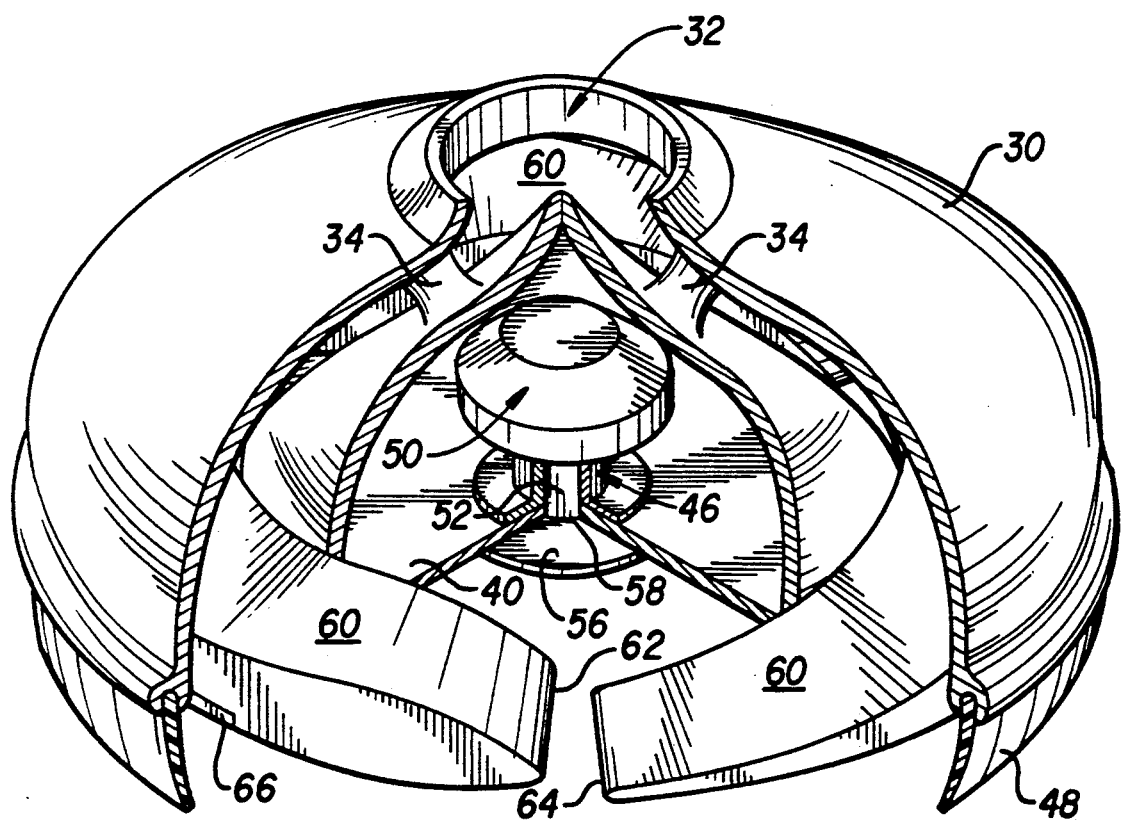
FIG. 4 is an assembled view, also partly in section, of the embodiment according to FIG. 3.

FIGS. 3 and 4 show a second embodiment according to the invention, which operates in the same manner as the embodiment of FIGS. 1 and 2.

Referring to FIG. 3, outer shell 30 and inner shell 36 are rigidly interconnected by strut members 34. Outer shell 30 has a central opening 32 at its top, and at its bottom is secured to the annular skirt member 48. In this embodiment, no damper is provided in the central opening 32, as the speed of ascent and descent can be adequately controlled solely by varying the speed at which the airfoils are rotated.

The inner shell 36 has a dome-shaped element 38 and a floor plate 40, which together define an interior cabin 44 suitable for receiving cargo and/or passengers. The floor plate 40 has a central hole 42 for passage of the motor shaft, and also has in this embodiment an engine mount 46 for supporting the engine above the hole 42.

FIG. 3 also shows the propeller drive assembly of this embodiment, comprising a central plate member 56 having three spokes 54 radiating therefrom, each spoke being connected to a respective airfoil unit 60. The airfoil units 60 of the present embodiment are the same as the airfoil units 8 of the preceding embodiment, except that the airfoil units 60 are three in number, rather than four, and their arcuate extent has been correspondingly increased. Each of the airfoil units 60 comprises a leading edge 62 and a trailing edge 64, with the series of airfoil units 60 being so arranged that the leading edges face the same direction in the circle. The central plate member 56 comprises a hole 58 in which is fixedly received the output shaft 52 of prime mover 50. It will be noted in this embodiment that the prime mover 50 with its output shaft 52 will be joined to the plate member 56 only through the hole 42 of the inner shell 36; that is, the motor and propeller unit according to this embodiment are not separable as an integrated unit from the twin shell structure.

FIG. 3 also illustrates the manner of connecting the spoke members 54 to the airfoil units 60. Specifically, the connection of the spoke members to the air foils should not interfere with the aerodynamic characteristics of the upper and lower surfaces of the air foil units 60. Accordingly, the ends 66 of spokes 54 which are connected to the airfoil units 60 are received in suitable cut-outs provided on the lower surface of the airfoil units. Connection between the spoke members 54 and airfoil units 60 may also be had by bolts passing from the spoke members 54, or directly from a disc 56 of increased diameter, through the side of the airfoil units 60.

FIG. 4 shows the embodiment of FIG. 3 in an assembled state, from which it can be seen that, as in the previous embodiment, the plate member 56 and spokes 54 underlie the floor plate 40 of the inner shell 36, and the airfoil units 60 occupy the annular space between the bottom of the inner shell 36 and outer shell 30. The manner of operation of the embodiment of FIGS. 3 and 4 is as described for the embodiment of FIGS. 1 and 2.

Although the invention has been described in connection with various preferred embodiments thereof, it will be appreciated that the embodiments are given solely for purposes of illustration, and are not to be construed as limiting the invention as set forth in the true spirit and scope of the appended claims.

What is claimed is:

1. A vertical take-off and landing aircraft, comprising an outer dome-shaped shell having a central axis and an inner dome-shaped shell disposed concentrically within the outer shell, struts rigidly interconnecting the inner and outer shells and maintaining a predetermined spacing therebetween, said outer shell having an upper central opening and being open at its bottom, thereby to define an annular air space between the inner and outer shells, the inner and outer shells being so configured as to have a progressively widening space therebetween moving centrally of the shells toward their bases; a circular series of airfoil elements disposed within the annular air space adjacent the bottoms of the inner and outer shells, each of said airfoil elements extending along an arc of a circle centered at the central axis of the outer shell, said airfoil elements each having a width not exceeding the spacing between the bottoms of the outer and inner shells and said airfoil elements being disposed between the outer and inner shells; and a motor mounted on the inner shell and having an output shaft coupled by a plate member to the circular series of airfoil elements, thereby to rotate the circular series of airfoil elements in unison.

2. The aircraft according to claim 1, further comprising a damper disposed within the central opening of the outer shell, and adjustable to vary the size of said opening.

3. The aircraft according to claim 1, further comprising a downwardly depending annular skirt secured at the lower edge of the outer shell.

4. The aircraft according to claim 3, wherein said annular skirt is formed of an elastomer material.

5. The aircraft according to claim 1, wherein said circular series of airfoil elements comprises three airfoil elements.

6. The aircraft according to claim 1, wherein said circular series of airfoil elements comprises four airfoil elements.

7. The aircraft according to claim 1, wherein said inner shell defines an interior chamber receiving the motor.

8. The aircraft according to claim 7, wherein said inner shell comprises a motor mount supporting the motor and guiding its output shaft downwardly through the inner shell.

* * * * *